Oct. 6, 1970    J. J. SCHOFIELD    3,532,441
PUMPS WITH VAPOR HANDING ELEMENT
Filed Sept. 4, 1968
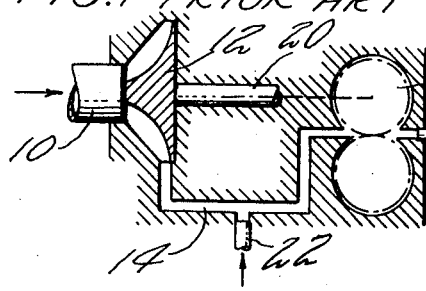
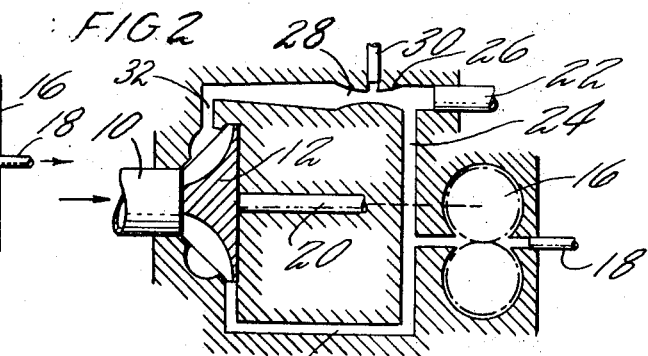
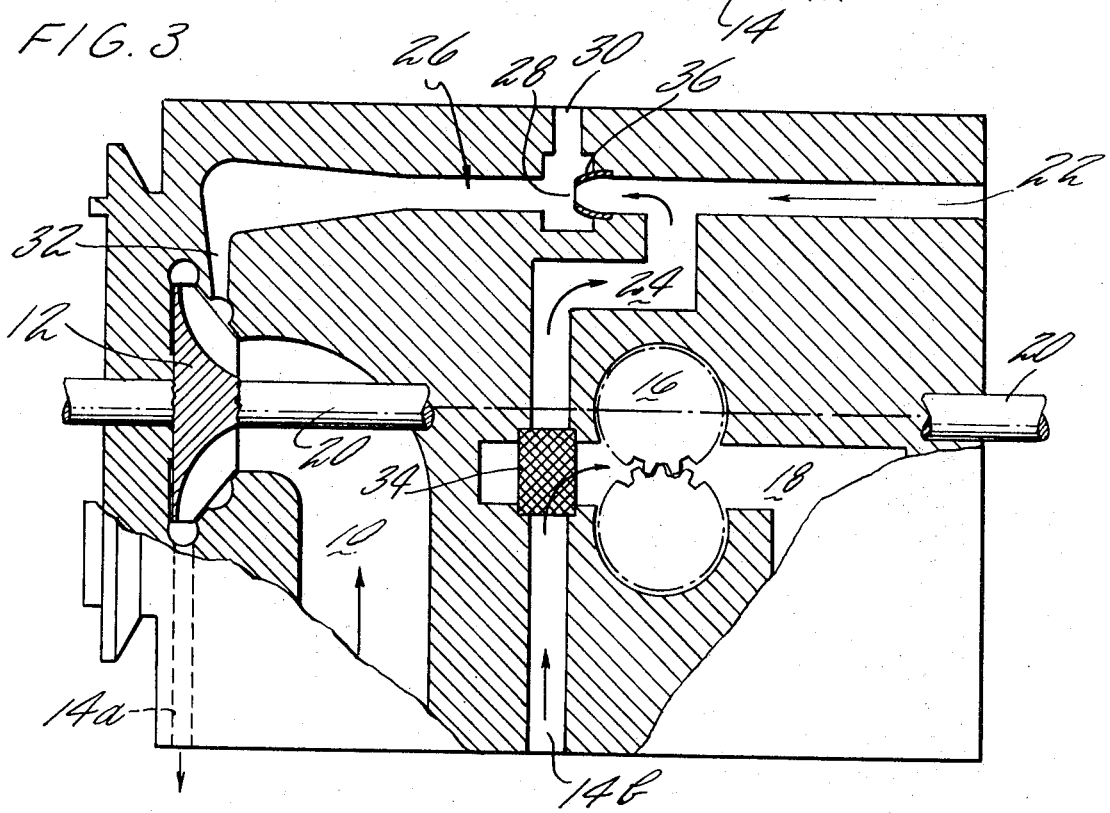
INVENTOR
JOHN J. SCHOFIELD
BY Fishman + Van Kirk
ATTORNEYS

United States Patent Office 3,532,441
Patented Oct. 6, 1970

3,532,441
PUMPS WITH VAPOR HANDLING ELEMENT
John J. Schofield, Glastonbury, Conn., assignor to Chandler Evans Inc., West Hartford, Conn., a corporation of Delaware
Filed Sept. 4, 1968, Ser. No. 757,233
Int. Cl. F04b *23/04;* F04d *9/00*
U.S. Cl. 417—203                                    15 Claims

ABSTRACT OF THE DISCLOSURE

A pumping system is disclosed in which a vapor handling element is incorporated to eliminate vapor lock of the pump feed lines. The vapor handling element is a jet eductor which employs unused pump system fluid as the primary flow in the eductor to draw in vapor from other points of the system, the vapor being compressed and introduced into the pump fluid stream for regular use.

BACKGROUND OF THE INVENTION (1) Field of the invention

This invention relates to pumping systems. More particularly, this invention relates to a fuel system incorporating a vapor handling element employed to draw system vapor, compress the vapor and redissolve it in the fuel stream for use.

(2) Description of the prior art

The presence of vapor in fluid pumping systems and the accompanying phenomenon of vapor lock has been a continual problem. The problem is of particular concern in fuel supply systems wherein vapor lock may result in shutdown of the engine or other element to which the fuel is being supplied. The problem is particularly acute and serious in aircraft engine fuel supply systems wherein the hazards and safety problems associated with vapor lock and undesired engine shutdown are readily apparent and need no elaboration.

In the past, the need for aircraft fuel supply systems capable of handling a certain amount of undissolved air and free vapor has generally been met by the use of fluid ring pumps and/or specially designed boost stages of the centrifugal type which feed the main pump to the engine. These prior approaches have been suitable for handling vapor to liquid ratios up to 0.45, i.e. up to 0.45 part of vapor for each part of liquid. However, with the advent of the recent family of large jet aircraft and with the imminent presence of even larger jet aircraft, the problem of the evolution of vapor in the fuel lines has become highly acute. The problem is especially serious with respect to aircraft having rear or tail mounted engines because the length of the long supply lines from the fuel tanks to the engines and the difference in elevation of the engines with respect to the fuel tanks are conditions especially conducive of evolution of large amounts of vapor. By way of illustration, whereas previous systems, as noted above, have had to deal with vapor to liquid ratios on the order of 0.45, it has now become necessary to have a system capable of handling a vapor to liquid ratio as high as 2.0, i.e. two parts of vapor for each part of liquid. The devices and systems which were formerly adequate to deal with the vapor problem are no longer capable of coping with the new dimension of the problem.

SUMMARY OF THE INVENTION

The present invention discloses a pumping system incorporating a vapor handling element whereby large amounts of vapor, such as vapor to liquid ratios on the order of 2.0, are handled by compressing the vapor and dissolving it in the supply stream for use. In the present invention a jet eductor uses excess pump fluid and unconsumed fuel being returned to the pump from the fuel control as the primary flow for driving the eductor. The eductor is connected to points in the system at which vapor normally accumulates or collects, and the eductor draws the vapor from these accumulation or collection points. The vapor drawn from accumulation points by the eductor is compressed and reintroduced into the pump fuel stream where it is dissolved and delivered for engine use.

The pump and eductor system of the present invention is capable of handling significantly higher vapor to liquid ratios than are currently possible, and thus the system of the present invention is especially suitable for the particular problems associated with the newer families of jet aircraft.

The use of the jet eductor in the present invention is of particular significance. The jet eductor is driven by a single phase fluid, thereby eliminating the design problems associated with stratified flow. The eductor can be incorporated into the system without restricting the main fuel inlet line, and it is a small unit with little power consumption. Additionally, the jet eductor is particularly suitable for reintroduction of the vapor into the system at a point where it can be redissolved.

Accordingly, one object of the present invention is to provide a novel liquid pump and vapor handling system.

Another object of the present invention is to provide a novel liquid pump and vapor handling system capable of handling vapor to liquid ratios on the order of 2.0.

Still another object of the present invention is to provide a novel liquid pump and vapor handling system wherein the vapor handling is accomplished by a jet eductor.

Still another object of the present invention is to provide a novel liquid pump and vapor handling system wherein a jet eductor is employed to insure collection of the vapor and dissolving thereof into the main pump fluid.

Still another object of the present invention is to provide a novel liquid pump and vapor handling system especially suitable for jet aircraft fuel systems.

Other objects and advantages will be apparent and understood from the following detailed description and drawings wherein like elements are numbered alike in the several figures.

BRIEF DESCRIPTION OF THE DRAWINGS

FIG. 1 is a simplified schematic representation of a typical prior art jet aircraft fuel pumping system without the capability of handling high vapor to liquid ratios.

FIG. 2 is a schematic representation of the liquid pump and vapor handling apparatus of the present invention.

FIG. 3 is a schematic view of the present invention similar to FIG. 2 showing the system of the present invention in slightly more detail.

DESCRIPTION OF THE PREFERRED EMBODIMENT

Although the present invention will be described with respect to a fuel delivery system for aircraft jet engines, it will be understood that the invention may find utility in any liquid handling system wherein vapor accumulation is a problem.

Referring now to FIG. 1, a simple schematic representation is shown of a standard prior art pumping system which does not incorporate special vapor handling apparatus. Fuel from a tank (not shown) is delivered via conduit 10 to a first stage or boost pump 12, pump 12 being a centrifugal pump. The flow of the fuel from the tank to pump 12 is indicated by the arrow to the left of conduit 10. The fuel entering pump 12 is at pump inlet pressure, and it leaves pump 12 and enters a conduit 14 at an increased pressure referred to as boost pressure. Conduit 14 delivers the fuel to a second stage gear pump 16 where the pressure of the fuel is increased to a level referred to as pump discharge, and the fuel at pump discharge pressure is delivered as indicated by the arrow via conduit 18 to the engine fuel control. Pumps 12 and 16 are commonly mounted on and driven by a common shaft 20, and a bypass return 22 is normally connected to conduit 14 to return unused fuel from the fuel control to a point in the system between pumps 12 and 16 for recirculation through pump 16 and redelivery to the control, the pressure level of the returned fuel thus being boost pressure. The presence of large amounts of vapor in fuel line 10 could result in a failure in the pumping system by causing centrifugal pump 12 to become dry, i.e. loose its prime, and thus the presence of undissolved vapor represents a serious problem which must be solved.

Referring now to FIG. 2, the system of the present invention is shown in schematic form. Fuel from the storage tank (not shown) flows via conduit 10 to first stage or boost centrifugal pump 12 and thence via conduit 14 to second stage gear pump 16 from which it is delivered via conduit 18 to the engine fuel control which constitutes a fluid consuming load. In accordance with the present invention, the capacity of centrifugal pump 12 is selected so that excess flow is available at the inlet to second stage pump 16. That is, the volume of fuel discharged from pump 12 during any given time period is greater than the volume required for pump 16 so that an excess is available at the inlet to pump 16. The excess fuel available at the inlet to pump 16 is carried by a conduit 24 to join with the bypass return flow from the control in bypass return line 22. It will be noted that the position of bypass return line 22 is such that the bypass fluid reenters the pumping system at a point where it is at the boost pressure level. The excess fuel in conduit 24 and the unused fuel from the control in bypass return 22 are combined and are delivered to the inlet of a jet eductor 26 so that the excess fuel in conduit 24 and the unused fuel in bypass return 22 serve as the primary flow or drive flow for jet eductor 26. It can be seen that the capacity of pump 12 must be greater than the capacity of pump 16 so that fuel will always be available for the primary flow of eductor 26.

Eductor 26 is of standard construction having a venturi section with a throat 28. The fuel passing through throat 28 is accelerated until the local pressure is near the vapor pressure of the fuel so that a point of low pressure is established at the throat. A vapor inlet line 30 is connected to the venturi at the throat, and vapor inlet line 30 is connected throughout the fuel supply system (such as by branch lines) to selected points at which vapor normally accumulates or collects, such as, for example, bends or high points in the fuel supply line. The action of jet eductor 26 causes the vapor at the points to which line 30 is connected to be drawn into the eductor via vapor inlet line 30. The momentum exchange between the primary flow through the eductor and the vapor thus drawn into the eductor raises the pressure level of the vapor to a pressure where it can be reinjected into the fuel stream and dissolved therein. The discharge from eductor 26 is connected via conduit 32 to centrifugal pump 12 at a point between the inlet and outlet of pump 12, preferably at or near midstage of boost pump 12 so that the compressed and pressurized vapor is reintroduced into and dissolved in the fuel flowing through pump 12. The dissolved vapor is then delivered, along with the normal fuel from pump 12 via conduit 14 to pump 16.

Referring now to FIG. 3, the system of the present invention is shown again in schematic form similar to FIG. 2 but in slightly more detail. Fuel enters via inlet conduit 10 and is delivered to the inlet of centrifugal pump 12 and then exits via conduit 14a. Conduit 14a corresponds to the upstream portion of conduit 14 in FIG. 2 but is labeled as branch 14a for purposes of illustration in FIG. 3. The fuel in conduit 14a at boost pressure may be delivered to intermediate structure such as an oil cooler or other heat exchange mechanism prior to delivery to pump 16, or it may be delivered directly to pump 16. In any event, the inlet line to pump 16 in FIG. 3 is labeled as conduit 14b which corresponds to that part of conduit 14 in FIG. 2 leading to the inlet of pump 16. The fuel in conduit 14b flows through a filter 34, and part of the fuel is then delivered to second stage pump 16 as indicated by the arrow. The discharge from pump 16 is then delivered via conduit 18 to the fuel control. The pump structure may, of course, have pressure sensing taps and recirculating flow lines for such standard features as release valve structures and pressure regulating valve structure; however, such elements are not illustrated since they form no part of the invention.

As stated above, the capacity of pump 12 is selected so that excess fuel is available at the inlet to pump 16, and this excess fuel is delivered via conduit 24 to merge with the bypass return fuel in conduit 22 whereupon the fuel in both lines is then delivered to the inlet of eductor 26 to serve as the primary flow thereof. The throat 28 of eductor 26 may be formed by an appropriately shaped removable throat element 36 so that the flow characteristics of the eductor 26 may be altered if desired. As discussed previously with respect to FIG. 2, vapor inlet 30 is connected at or near the throat of the eductor, and the combined fluid and compressed vapor at the discharge of eductor 26 is delivered via conduit 32 to a midstage location in centrifugal pump 12 whereby the vapor is redissolved and becomes part of the fuel flow discharge from pump 12 to branch conduit 14a.

The liquid pump and vapor handling system thus described is capable of handling and redissolving extremely large amounts of vapor. As pointed out above, the system of the present invention can adequately handle the vapor problem in applications where the vapor to liquid ratio is as high as 2. The eductor is a particularly attractive element for use as the vapor handling mechanism since it works only on a single fluid phase, since it can be located at a position other than the fuel inlet 10 to pump 12 whereby the fuel inlet line is not restricted or otherwise impaired, and since it is of small size and consumes very little power.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A liquid pumping and vapor handling system including:
   pumping means for raising the pressure level of a fluid to be delivered from a supply to a fluid consuming load, the pumping means including a pump having an inlet stage, an intermediate stage and an outlet stage;
   return means connected to said pumping means for returning unused fluid from the fluid consuming load to said pumping means; and
   vapor handling means for drawing and compressing vapor of said fluid, said vapor handling means being between said return means and said pumping means and being connected to deliver compressed vapor to said pumping means at the intermediate stage of the pump.

2. A liquid pumping and vapor handling system as in claim 1 wherein:
   said vapor handling means is an eductor.

3. A liquid pumping and vapor handling system as in claim 2 wherein:
   said educator is connected to said return means to employ said unused fluid to drive said eductor.

4. A liquid pumping and vapor handling system as in claim 3 wherein:
   said eductor includes a vapor inlet line connected to draw vapor accumulation of said fluid.

5. A liquid pumping and vapor handling system including:
  a pumping unit having
    first pumping means for raising the pressure level of a fluid to be delivered from a supply to a fluid consuming load to a first level, the first pumping means including a centrifugal pump having a fluid inlet connected to the supply and a fluid outlet;
    second pumping means for raising the pressure level of said fluid to a second level;
    first conduit means connecting the outlet from said first pumping means to the inlet to said second pumping means;
    the capacity of said first pumping means being greater than the capacity of said second pumping means whereby an excess of fluid is present upstream of said second pumping means,
    fluid path means from upstream of said second pumping means to said first pumping means to return said excess to said first pumping means between the inlet and outlet;
    vapor handling means in said fluid path means for drawing and compressing vapor of said fluid, for delivery to said first pumping means between the inlet and outlet.

6. A liquid pumping and vapor handling system as in claim 5 wherein:
  said vapor handling means is an eductor, said excess fluid being employed to drive said eductor.

7. A liquid pumping and vapor handling system as in claim 6 wherein:
  said eductor includes a vapor inlet line connected to draw vapor accumulations of said fluid.

8. A liquid pumping and vapor handling system as in claim 7 wherein:
  said vapor inlet line is connected to the throat of said eductor.

9. A liquid pumping and vapor handling system as in claim 5 including:
  return means connected to said fluid path means upstream of said vapor handling means for returning unused fluid from said fluid consuming load to said pumping means, the fluid in said return line joining with said excess for return to said first pumping means.

10. A liquid pumping and vapor handling system as in claim 5 wherein:
  said vapor handling means is an eductor, said excess fluid and said fluid in said return line being employed to drive said eductor.

11. A liquid pumping and vapor handling system as in claim 11 wherein:
  said eductor includes a vapor inlet line connected to draw vapor accumulations of said fluid.

12. A liquid pumping and vapor handling system as in claim 7 wherein:
  said vapor inlet is connected to the throat of said eductor.

13. A liquid pumping and vapor handling system including:
  pump means for pressurizing a fluid to be supplied to a fluid consuming load, the pump means including a contrifugal pump having an inlet and an exit;
  fluid return means connected between the fluid consuming load and the pump means for returning fluid unused by the fluid consuming load to the pump means; and
  vapor handling means connected with the fluid return means for drawing and compressing vapor from the fluid, the vapor handling means being connected to the pump means intermediate the inlet and the exit of the centrifugal pump to deliver the compressed vapor to the pump means.

14. The liquid pumping and vapor handling system of claim 13 wherein:
  the vapor handling means is a fluid eductor sealed against fluid leakage within the pumping and handling system.

15. A liquid pumping and vapor handling system according to claim 1 wherein:
  the pump is a centrifugal pump; and
  the vapor handling means is connected at the midstage of the centrifugal pump.

References Cited

UNITED STATES PATENTS

| | | | |
|---|---|---|---|
| 3,387,644 | 6/1968 | Heinecke et al. | 103—5 |
| 2,826,147 | 3/1958 | Gaubatz | 103—97 |
| 3,128,822 | 4/1964 | Tyler | 103—97 |
| 3,217,655 | 11/1965 | Sercy et al. | 103—97 |
| 3,309,995 | 3/1967 | Tyler | 103—97 |
| 1,430,303 | 9/1922 | Hartman | 261—76 |
| 2,272,906 | 2/1942 | Da Col | 103—5 |
| 2,737,961 | 3/1956 | Buckley | 103—5 |
| 2,980,028 | 4/1961 | Edwards et al. | 103—5 |
| 3,105,441 | 10/1963 | Grill et al. | 103—5 |

FOREIGN PATENTS

| | | |
|---|---|---|
| 1,143,499 | 4/1957 | France. |
| 154,082 | 11/1920 | Great Britain. |

HENRY F. RADUAZO, Primary Examiner

U.S. Cl. X.R.
417—80, 89